United States Patent [19]
Naylor, Jr.

[11] Patent Number: 5,757,516
[45] Date of Patent: May 26, 1998

[54] NOISE QUENCHING METHOD AND APPARATUS FOR A COLOUR DISPLAY SYSTEM

[75] Inventor: William Clark Naylor, Jr., Mount Kuring-gai, Australia

[73] Assignee: Canon Inc., Tokyo, Japan

[21] Appl. No.: 177,307

[22] Filed: Jan. 4, 1994

[30] Foreign Application Priority Data

Jan. 11, 1993 [AU] Australia ................. PL6759

[51] Int. Cl.$^6$ ................................................... H04N 1/38
[52] U.S. Cl. ............... 358/463; 358/466; 358/518; 358/534; 348/533; 382/275
[58] Field of Search ................. 358/463, 466, 358/456, 445, 447, 533, 534, 536, 537; 348/533, 535, 606, 607, 622, 683, 530, 252; 371/64; 382/270, 308, 284, 291, 275, 271, 168, 172

[56] References Cited

U.S. PATENT DOCUMENTS

| | | | |
|---|---|---|---|
| 3,805,239 | 4/1974 | Watanabe | 382/271 |
| 4,213,155 | 7/1980 | Miienchow | 358/447 |
| 4,355,337 | 10/1982 | Sekigawa | 358/447 |
| 4,408,343 | 10/1983 | Neil et al. | 382/271 |
| 4,584,605 | 4/1986 | Odozynski | 382/271 |
| 4,630,307 | 12/1986 | Cok | 348/252 |
| 4,853,795 | 8/1989 | Morton et al. | 358/447 |
| 4,894,540 | 1/1990 | Komatsu | 250/307 |
| 5,001,576 | 3/1991 | Tanaka et al. | 358/447 |
| 5,032,904 | 7/1991 | Murai et al. | 358/530 |
| 5,051,844 | 9/1991 | Sullivan | 358/455 |
| 5,081,690 | 1/1992 | Tan | 382/271 |
| 5,159,449 | 10/1992 | Allmendinger | 348/533 |
| 5,170,441 | 12/1992 | Mimura et al. | 382/45 |
| 5,212,739 | 5/1993 | Johnson | 382/9 |
| 5,254,982 | 10/1993 | Feigenblatt | 345/148 |
| 5,257,182 | 10/1993 | Luck et al. | 364/413.1 |
| 5,307,426 | 4/1994 | Kanno et al. | 382/50 |
| 5,325,211 | 6/1994 | Eschbach | 358/466 |
| 5,335,019 | 8/1994 | Herz et al. | 348/607 |
| 5,337,160 | 8/1994 | Jones | 358/447 |
| 5,337,373 | 8/1994 | Marandici | 358/466 |
| 5,341,228 | 8/1994 | Parker et al. | 358/536 |
| 5,375,002 | 12/1994 | Kim et al. | 358/521 |
| 5,412,737 | 5/1995 | Govrin | 382/168 |

FOREIGN PATENT DOCUMENTS

| | | | |
|---|---|---|---|
| 0206466 | 12/1986 | European Pat. Off. | |
| 6116379 | 1/1986 | Japan | 382/271 |
| 4127775 | 5/1992 | Japan | |

*Primary Examiner*—Edward L. Coles, Sr.
*Assistant Examiner*—Madeleine A-V Nguyen
*Attorney, Agent, or Firm*—Fitzpatrick, Cella, Harper & Scinto

[57] ABSTRACT

An apparatus and method for suppressing noise and an input image having a plurality of pixels, each of the pixels in the plurality of pixels having a range of possible values between at least two extremities. A first group of pixels is determined, each pixel of the first group having a value that is less than a predetermined amount from the value of at least one of the extremities. The values of pixels adjacent to each pixel in the first group are examined to determine if the adjacent pixels are also members of the first group and, when a predetermined number of the pixels adjacent to a pixel in the first group are also members of the first group, reassigning the pixel value of that pixel in the first group and each of its adjacent pixels to have the value of at least one of the extremities.

10 Claims, 12 Drawing Sheets

NOISE QUENCHING METHOD AND APPARATUS FOR A COLOUR DISPLAY SYSTEM

FIELD OF THE INVENTION

The present invention relates to a colour display apparatus such as colour computer displays and colour printers, and, in particular, the display of colour images on a discrete level colour display apparatus.

BACKGROUND OF THE INVENTION

Various aspects of the prior art can now be discussed with reference to the following drawings in which:

FIG. 1 is a schematic view of a pixel of a CRT-type display of a prior art device.

FIG. 2 is a schematic view of the range of colours that can be displayed with a pixel as shown in FIG. 1.

FIG. 3 is a block diagram form of the conventional arrangement for connecting a computer device to an output display.

FIG. 4 is a schematic view of an error diffusion process.

Colour display devices are well known in the art. For example, colours are often displayed on a computer display according to a particular model. The red, green, blue (RGB) primary colour model is one that is in common use with Cathode Ray Tubes (CRT) and colour raster display devices. Other colour display models include cyan, magenta, yellow (CMY) often used in colour-printing devices. An example of the use of a RGB model is in the NTSC picture display standard in common use with computer displays. In this standard, each pixel element is divided into three separate sub groupings. These separate subgroupings represent the Red, Green and Blue portion of a given pixel element respectively.

As depicted in FIG. 1, the viewing surface of a colour RGB model CRT often consists of closely spaced pixels 1. Each pixel is made up of a red (R), green(G) and blue (B) phosphor dot or pixel element. These dots are so small that light emanating from the individual dots is perceived by the viewer as a mixture of the corresponding three colours. A wide range of different colours can thus be produced by a given pixel by variation of the strength with which each phosphor dot is excited.

Referring now to FIG. 2, in order to conceptualize the range of colours that can be printed by this method it is helpful to map these colours into a unit cube 9. The directions of increasing intensity of individual primary colours is shown by axes 10. The maximum intensity values have been normalized to 1 and the minimum intensity value is normalized to zero. The individual intensity contributions of each of the three separate primary colours at any one particular point are vectorially added together to yield the final colour. For example, the main diagonal of the cube, with equal amounts of each primary colour, represents the different grey levels or grey scale, from black (0,0,0) to white (1,1,1).

A driving arrangement (not shown but known in the art) is normally provided with the CRT type display so that the strength of each phosphor dot's excitation has some proportionality to the value that is input to the driving arrangement. A timing arrangement (not shown but similarly known) is also normally provided which is adapted for use in determining which pixel of the display is to be illuminated.

Turning now to FIG. 3, there is shown the normal prior art arrangement for an interface from an output device such as a computer device 11 to its preferred form of display 13 which is shown as a CRT type display 13. It is assumed that the display is an RGB type display. The output format from the computer device 11 is normally in the form of separate channels for red 51, green 52 and blue 53 display information for each primary colour of the display with the inclusion of an extra channel 54 for timing and control information. Alternatively the control and timing information is included in one of the primary colour's channel of information. This information is normally transferred to the display 13 by means of one or more cables 12 (seen in FIG. 5) able to carry the information.

The output information from the computer device 11 is normally conveyed to the display 13 in an analogue format with the channel level having some proportionality to the intensity to be displayed. As the channel information is in an analogue format, it is liable to pick up noise from its environment and from the limitations of the cabling through which the signal is travelling. If the display 11 to which the computer device is connected should require to convert this information to a digital format, the conversion process will be forced to include the noise in the determination of its digital output level.

With the input to the display 13 in an analogue format it is normally assumed that the display 13 is easily able to display a large number of different intensity levels for each primary colour of the input. Some discrete level display devices are unable to display the large number of intensity levels for each of the expected primary colours. For example, a black and white raster image display can only display two colours, namely black and white and is known as a bi-level device. Other colour display devices can only display a finite number of discrete intensity levels for each primary colour. By way of further example, in a colour bi-level device, such as a ferroelectric liquid crystal display (FLCD), each pixel element on the screen can be at just two intensity levels, either fully on or fully off. If, for example, a display device can display red, green, blue and white primary colours the total number of different colours that each pixel can display will be $2^4=16$ different colours.

If the input to the display device is in a format that assumes that there is a larger number of intensity levels for each channel then there will be an error in the colour displayed, being the difference between the exact pixel value required to be displayed and the approximated value actually displayed from the restricted set of possible display colours. Methods have been developed to increase the number of colours displayable on an discrete colour display device such as a bi-level colour display. The methods used are known generally as halftoning. For an explanation of the different aspects of halftoning and a survey of the field of halftoning reference is made to the book 'Digital Halftoning' by Robert Ulichney, published in 1991 by MIT Press.

One method described by Ulichney to improve the quality of a displayed image, is called error diffusion. This process was developed by Floyd and Steinberg for a single colour (black or white) display and is described in "An Adaptive Algorithm for Spatial Gray Scale", Society for Information Display 1975 Symposium Digest of Technical Papers, 1975, 36. In the Floyd and Steinberg algorithm, the error associated with each pixel value is added to the values of some of the neighbouring pixels of the given current pixel in such a manner that the sum of these additions is equal to the error associated with the pixel value. This has the effect of spreading or diffusing the error over several pixels in the final image to give an improved quality in the reproduction of a given input image. An example of this process is shown in FIG. 4. In this example, a decision is made to spread the error associated with a current pixel 2, such that two eighths of the error is assigned to a pixel 3 on the right of the current pixel 2, one-eighth is assigned to its neighbour 4, two eighths is assigned to a pixel 5 below the current pixel 2, and one eighth is assigned to pixels marked 6, 7, 8 respectively.

Alternatively, a process of independent error diffusion of each primary colour channel could be used. Also, other methods of halftoning can be used such as dithering of the input image. All these methods of halftoning can be used to display an analogue output on a discrete level display.

SUMMARY OF THE INVENTION

In accordance with one aspect of the present invention, there is disclosed a method for suppressing noise in an input image comprising a plurality of pixels, the pixels having a range of possible values, the method comprising the steps of:

determining a first group of pixel values which are less than a predetermined distance from an extremity of the range of possible values, for each pixel value in the first group of pixel values:

examining the values of neighbouring pixels in the input image to determine if they are also at the extremity of the range of possible values, and where a second predetermined number of the neighbouring pixels are at the extremity of the range of possible values, reassigning the pixel value of the pixels to be at the extremity of the range of possible values.

In accordance with another aspect of the present invention, there is provided apparatus for suppressing noise in an input image, said image comprising pixels, said apparatus comprising:

detecting means, for detecting if a group of pixels are near an extremity of possible values;

reassignment means for reassigning said pixels to the extremity when said group is detected.

BRIEF DESCRIPTION OF THE DRAWINGS

A preferred embodiment of the present invention will now be described with reference to the remaining drawings in which.

DESCRIPTION OF THE PREFERRED EMBODIMENTS

Figure 1:
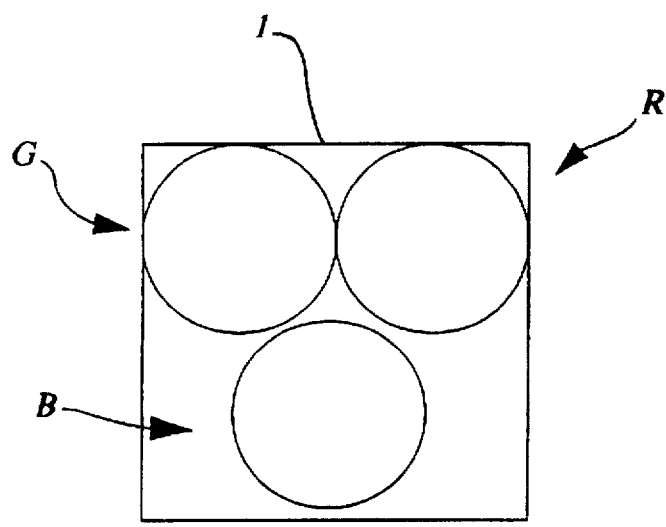
Figure 2:
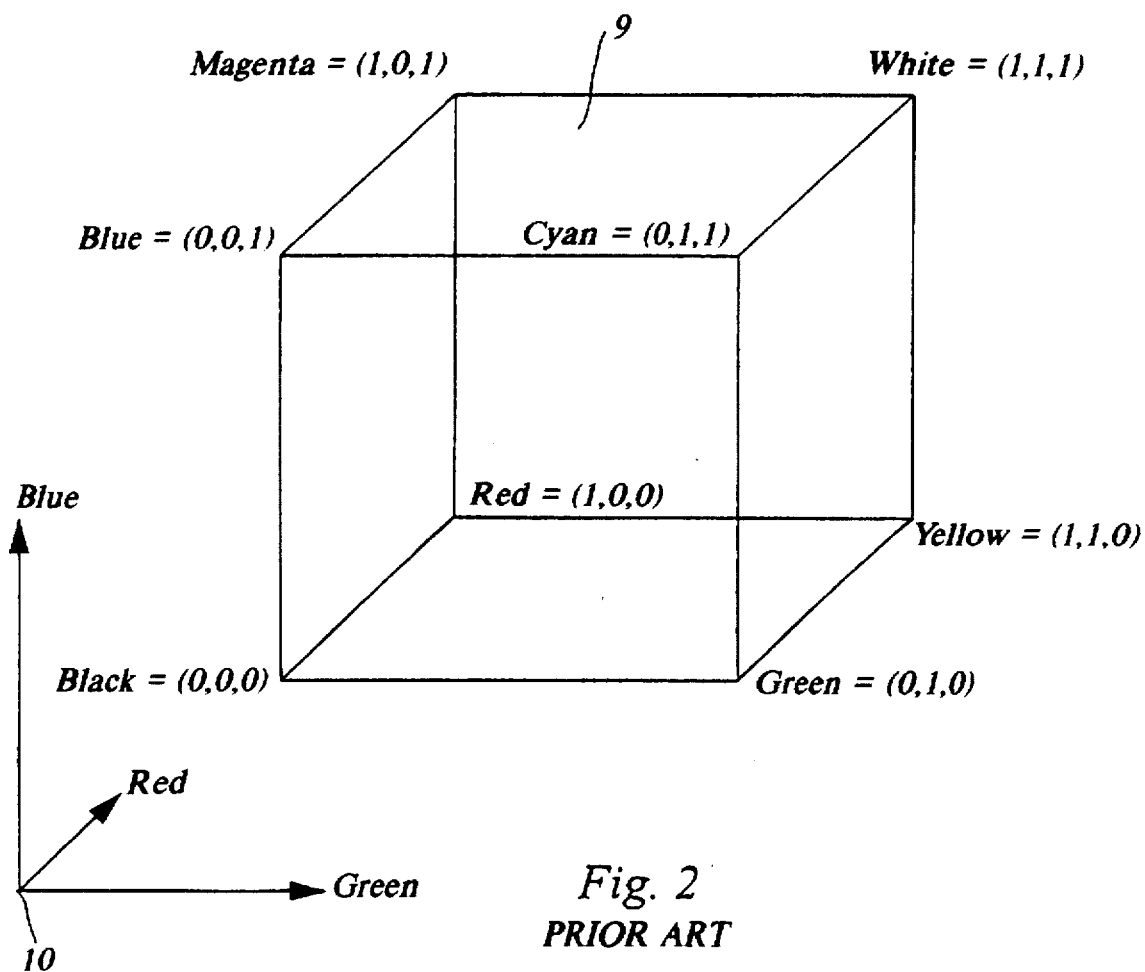
Figure 3:
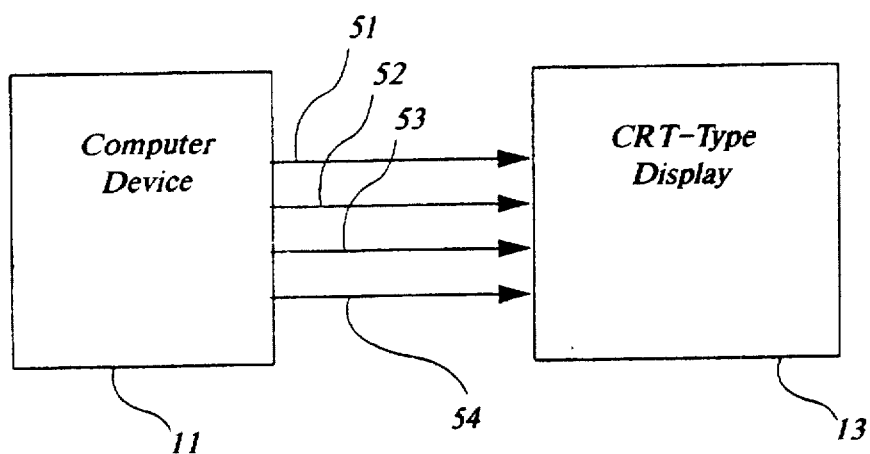
Figure 4:
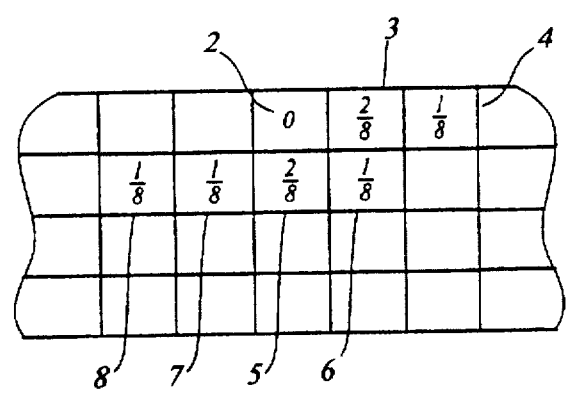
Figure 5:
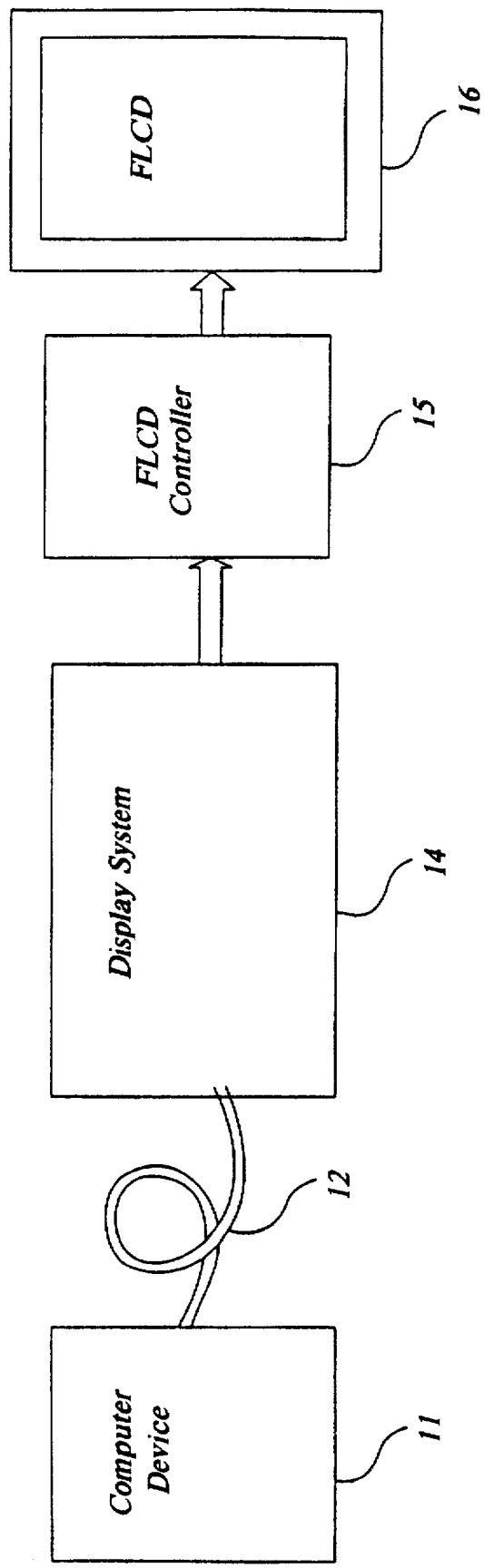
FIG. 5 is a block diagram form of a display device for use with the preferred embodiment.

In FIG. 5 there is shown a discrete level display in the form of a Ferro-Electric Liquid Crystal Display (FLCD) 16,
and its controller 15. A computer device 11 produces output in an analogue format as mentioned previously, and this information is sent for display along a cable 12. Interposed between the computer device 11 and the FLCD 16 is a display system 14 for conversion of the analogue output from computer device 11 into a form suitable for on the FLCD display 16. For the purposes of the preferred embodiment it can be assumed that display system 14 includes an analogue to digital converter for each input channel in cable 12, whereby the input in an analogue format is converted to a corresponding digital format for processing by the display system 14.

Figure 6:
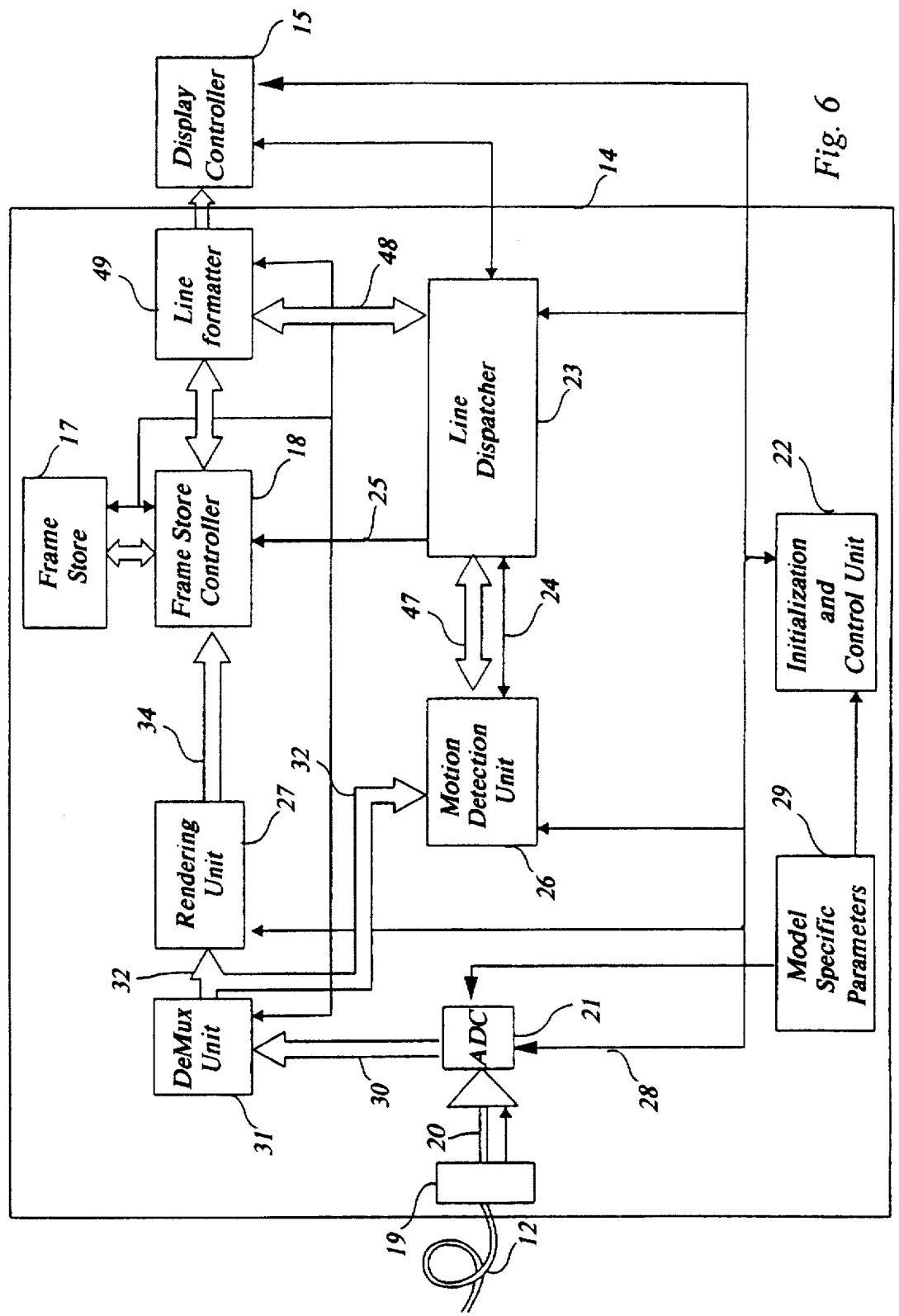
FIG. 6 is a schematic view of the different parts of a colour display system of FIG. 5.

Referring now to FIG. 6, there is shown the display system 14 of the above mentioned application in more detail. The display system 14 includes an analogue to digital conversion unit 21 which converts analogue input into an 8 bit digital representation of pixel values in addition to pixel clocking and associated control in formation. A demultiplexer 31 groups together pixels, two at a time, so as to reduce processing speed requirements, and forwards them to a rendering unit 27.

Figure 7:
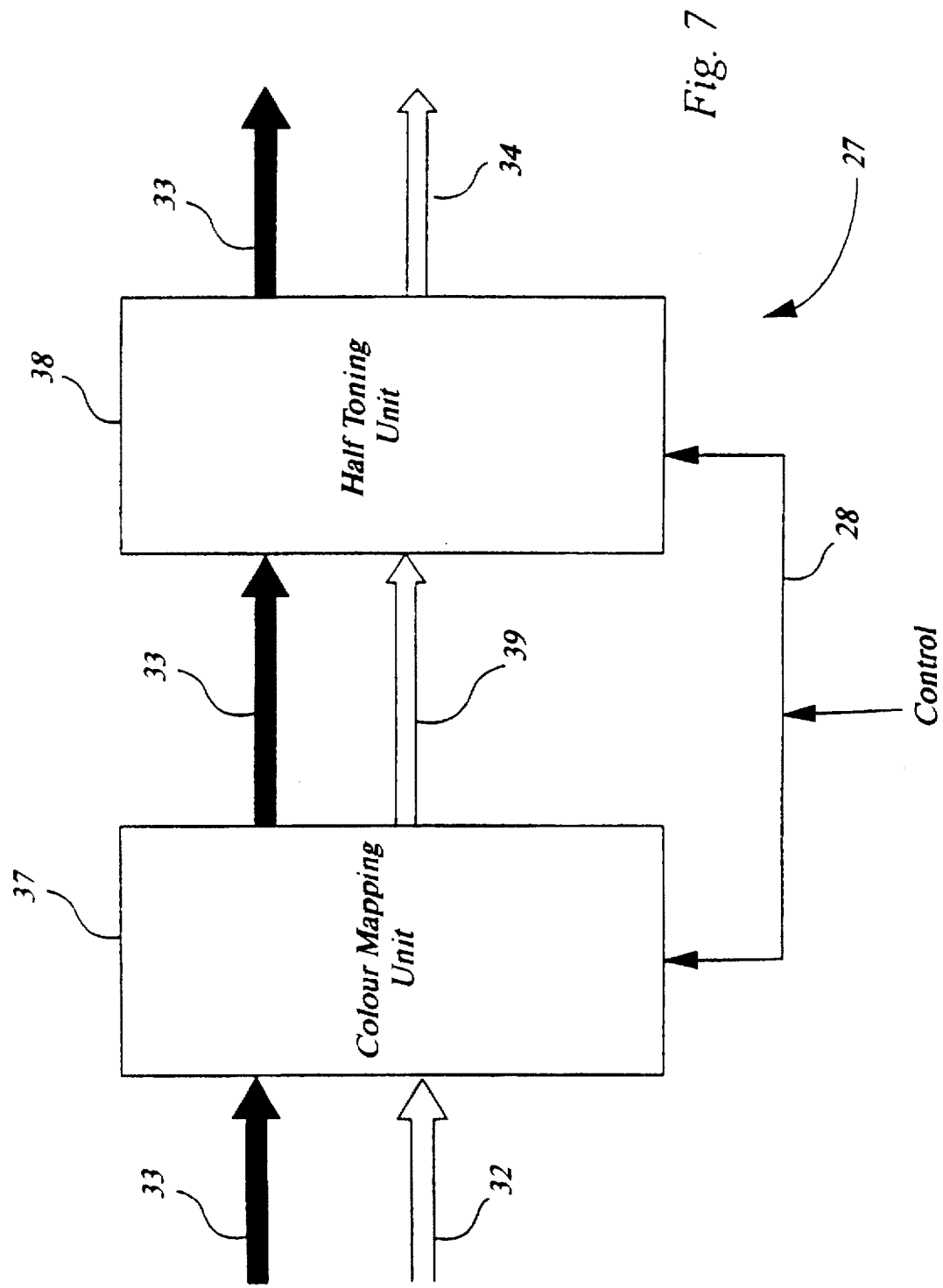
FIG. 7 is a schematic view of the rendering unit of the colour display system of FIG. 6.

Turning now to FIG. 7, the rendering unit 27 consists of a colour mapping unit 37 and a halftoning unit 38. A demultiplexer output bus 32 connects to the colour mapping unit 37 to supply RGB pixel information. Synchronization information comprising the pixel clock, vertical sync and horizontal sync signals, are supplied with the pixel input. The colour mapping unit 37 performs a series of transforms on the input RGB pixel data before sending the transformed pixels to the halftoning unit 38, via a colour mapping to halftoning pixel bus 39, to halftone the pixels to produce 4-bit pixel output. This output appears on rendering unit output bus 34.

Figure 8:
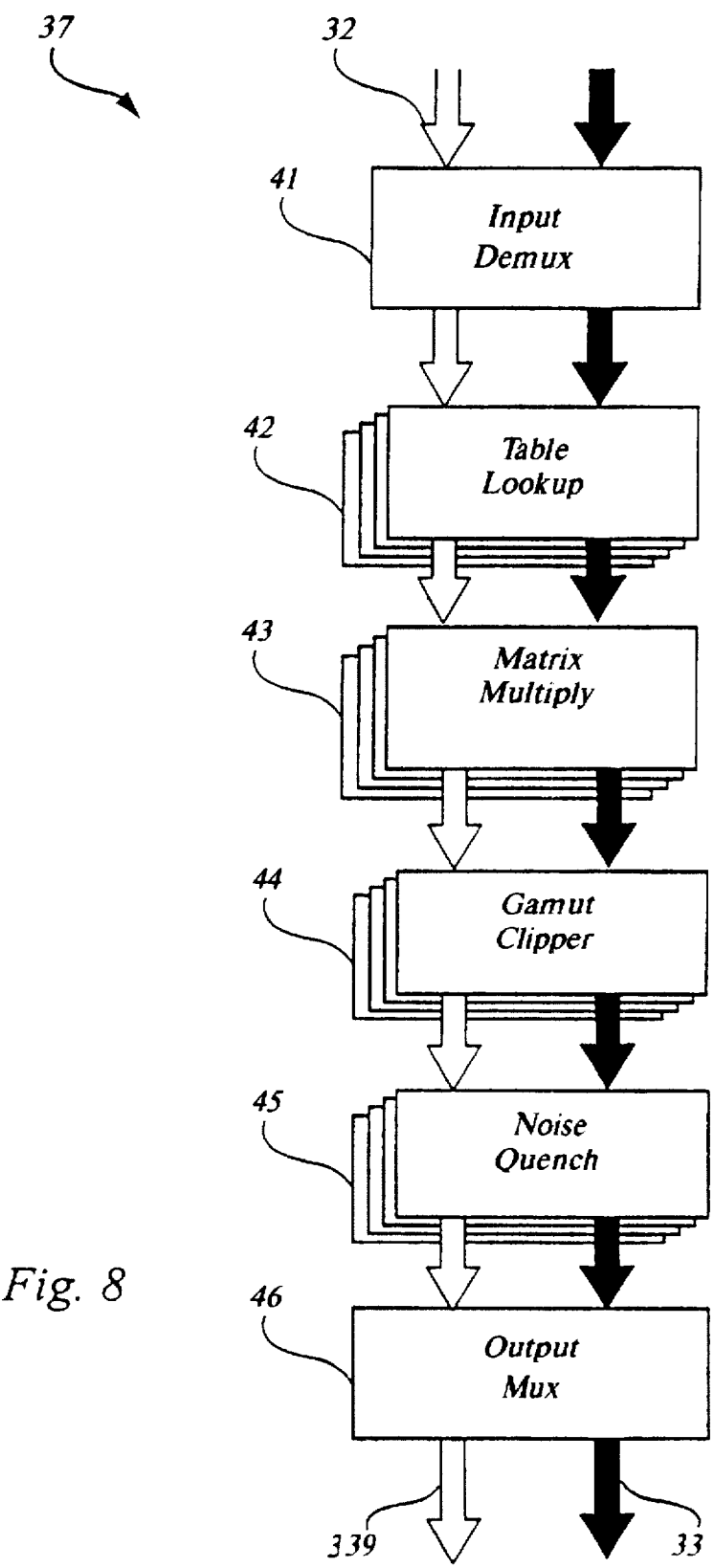
FIG. 8 is a schematic view of the colour mapping unit of FIG. 7.

Referring now to FIG. 8, there is shown in more detail a first embodiment of the colour mapping unit 37. The colour mapping unit 37 performs a series of transformations on RGB digital video data, mapping each pixel of the input data to a new position in RGB space. The purpose of these transformations is to modify video data intended for display on a CRT so that it is suitable for display within the gamut of the FLCD 16.

The colour mapping unit 37 has a pipelined structure, with identical input and output interfaces. Each of the colour transformations can be switched in or out by appropriate configuration.

The colour mapping unit 37 performs a series of transformations on the input RGB data prior to halftoning. These transformations are applied one after the other, re-mapping data within the RGB space to achieve the following effects:

1. Gamma Correction (also called DeGamma)
2. Contrast Enhancement
3. Colour Masking
4. Gamut Clipping
5. Noise Quench The pixel input data is taken from demultiplexer output bus 32, two pixels at a time. The pixel input data is further demultiplexed by colour mapping demultiplexer 41 so that the rest of the colour mapping unit 37 works in parallel on four pixels at a time.

A colour mapping table lookup unit 42 implements the processes of gamma correction and contrast enhancement by replacing each pixel by a predetermined value stored in a lookup table whose values can be written through a configuration interface at system start-up.

Gamma correction is a monotonic, non-linear transformation applied to the Red, Green and Blue components of a pixel independently. Its purpose is to correct the intensity of the incoming colour components, which are originally intended for display on a CRT, to match a FLCD panel's characteristics. Given that the primary colour component values of each pixel is in the range of 0 to 255, the following formulae must be applied to each of the input colour components:

$R_{out}=255*(R_{in}/255)^{\gamma}$;

$G_{out}=255*(G_{in}/255)^{\gamma}$; and $B_{out}=255*(B_{in}/255)^{\gamma}$.

The value of $\gamma$ is a measurement of the colour response characteristics of a given panel and is determined by measurement. The colour mapping unit 37 can implement this degamma function using a lookup table.

Contrast Enhancement is a linear transformation, also applied to Red, Green and Blue components independently. Contrast enhancements moves all colours towards the corners of the input gamut, increasing the contrast between near-black and near-white areas. Preferably contrast enhancement is implemented by changing the values loaded into the lookup table of colour mapping table lookup unit 42 as this avoids the colour mapping unit 37 having any hardware dedicated specifically to contrast enhancement.

Contrast enhancement applies a linear multiplication factor to each of the R, G and B values of each sample, according to the formula:

$R_{out}=((R_{in}-128)*(256/h))+128$;

$G_{out}=((G_{in}-128)*(256/h))+128$; and $B_{out}=((B_{in}-128)*(256/h))+128$, where h is an integer in the range of 1 to 256.

Figure 9:
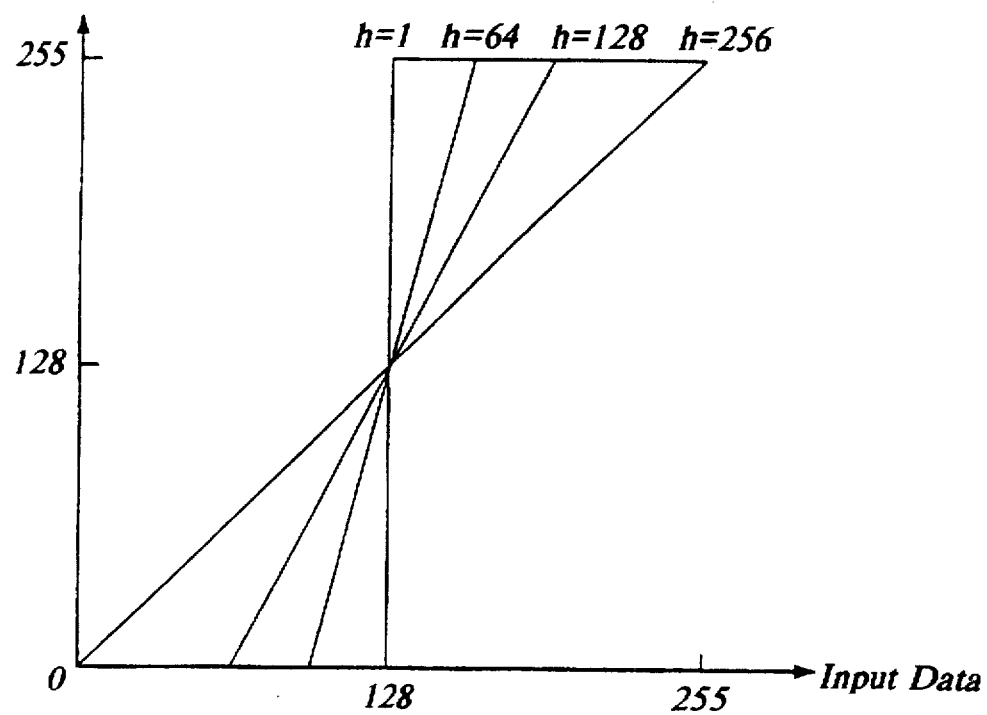
FIG. 9 illustrates the contrast enhancement process.

FIG. 9 shows the corresponding effect of contrast enhancement on input pixels for different values of h being one of 1, 64, 128, and 256.

As seen in FIG. 8, a colour mapping matrix multiply unit 43 implements Colour Masking by applying a programmable matrix multiplication to the incoming RGB data. Colour Masking is a matrix transformation of the input data where each output (Red, Green and Blue) depends on each of the Red, Green and Blue inputs. It is designed to compensate for any non-orthogonal colour characteristics of the FLCD 16. A possible additional function of the colour mask circuit is to perform RGB to luminance conversions employing the Green matrix multiply circuit only.

The colour mapping matrix multiply unit 43 includes nine programmable registers which hold matrix coefficients $a_{rr}$ through to $a_{bb}$, which are loaded at start-up time and are determined from measurement of the colour characteristics of the FLCD 16. The colour mapping matrix multiply unit 43 produces output colours according to the following formula.

$R_{out}=a_{rr}R_{in}+a_{rg}G_{in}+a_{rb}B_{in}$ $G_{out}=a_{gr}R_{in}+a_{gg}G_{in}+a_{gb}B_{in}$ $B_{out}=a_{br}R_{in}+a_{bg}G_{in}+a_{bb}B_{in}$ A gamut clipping unit 44 compensates for the fact that the RGBW display of the FLCD panel cannot represent all of the possible values in the RGB space. Values that cannot be represented, which are generally near-saturated colours, are remapped to within the panel's colour gamut.

A noise quenching unit 45 attempts to compensate for rectified noise in the near-saturated regions of the input. It works by mapping near-saturated pixels to their saturated values if some number of the adjacent pixels are also saturated.

A colour mapping multiplexer 46, multiplexes the pixels so that the output format of the pixels is the same as that of the input to colour mapping demultiplexer 41. Referring now to FIG. 7, the pixel and control information is subsequently forwarded on colour mapping to halftoning pixel bus 39 and to colour mapping to halftoning control bus 40 to the halftoning unit 38.

Figure 10:
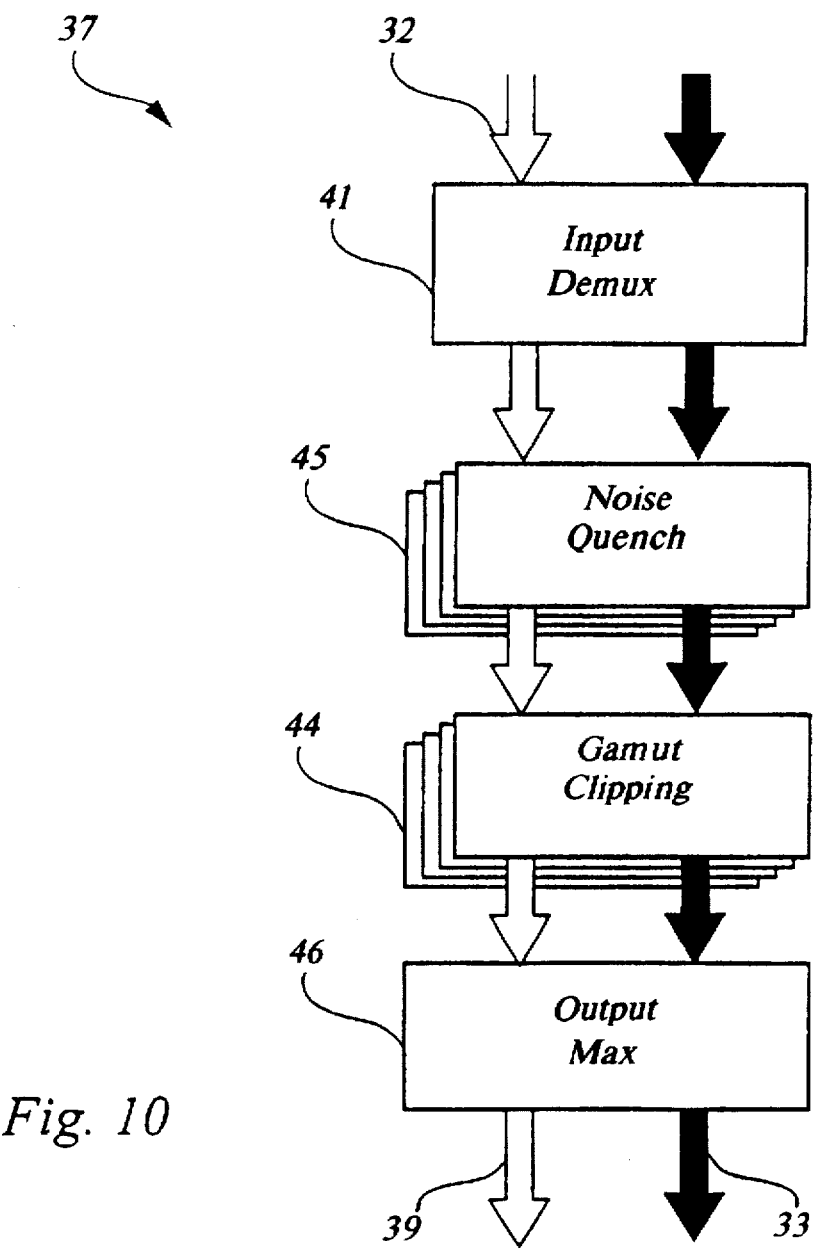
FIG. 10 is a schematic view of a second embodiment of the colour mapping unit of FIG. 7.

Referring now to FIG. 10, there is shown a second embodiment of the colour mapping unit 37 containing only the colour mapping demultiplexer 41, gamut clipping unit 44, noise quenching unit 45 and colour mapping multiplexer 46. The second embodiment has the advantage of a substantial reduction in complexity in comparison to the first embodiment with the disadvantage of a loss in versatility in being unable to preform gamma correction, contrast enhancement or colour masking.

Returning to FIG. 6 and FIG. 7, the halftoning unit 38 transforms continuous tone RGB data input on colour mapping to halftoning control bus 40, to 4-bit per pixel RGBW pixel data, suitable for display on the FLCD 16. Output pixel data is forwarded to the frame store controller 18 for storage in the frame store 17.

It is envisaged that different gamut clipping methods can be used for different areas of the RGB cube structure, additionally a combination of methods can be employed in areas where this is found to give superior results. Appendix 1 shows a C-code simulation of the simultaneous use of two different methods, being the shortest distance method and the drop clip method.

The particular values used in the C-code simulation are dependant on the position of various pixels including the white pixel in the input RGB colour space. In the Appendix, it is assumed that the white pixel has co-ordinates R=G=B= 102 and that the value of each primary colour ranges from 0 to 255. In an actual implementation, the various pixels values can be loaded as a configuration variable.

In this simulation the drop-clip method is preferred and used in the blue-red (magenta) and red saturated corners of the RGB cube and the shortest distance method is used near the green, blue-green (cyan) and red-green (yellow) corners.

As a consequence of the description in the foregoing embodiment, it can be seen that input data presented in, for example, an RGB format can be displayed on a device having a different output format than the input format, while simultaneously attempting to use the full potential of the output display in its use of colours and their respective intensities.

Figure 11:
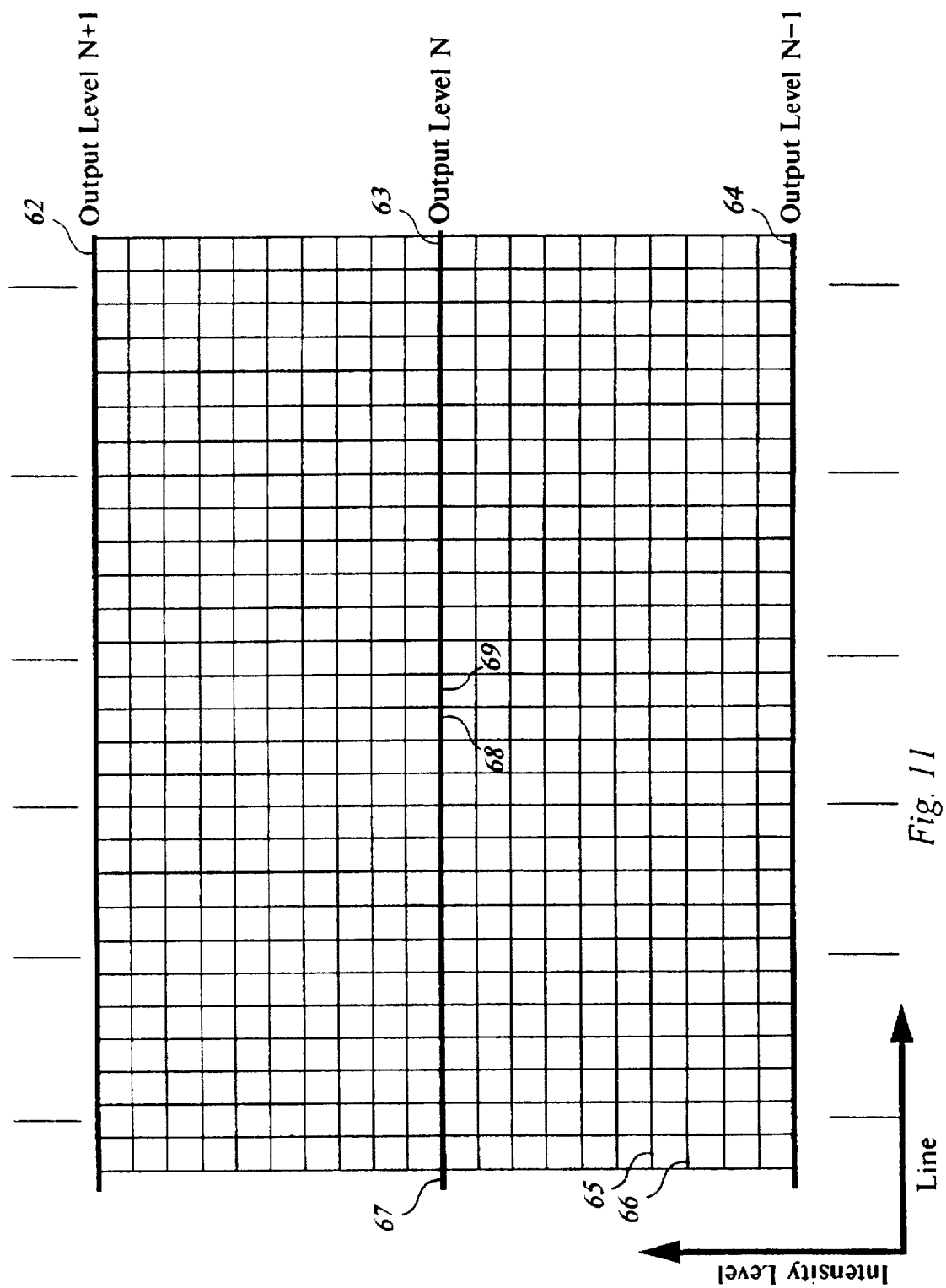
FIG. 11 is a graphical view of the pixel intensity level versus pixels on a line, for a region of constant intensity.

Turning now to FIG. 11, an example is shown of the process of error diffusion which is normally used where the number of levels of an output device is less than the number of levels assumed by the input means to that device. FIG. 11 shows the granularity of the possible output levels, 62, 63, 64 is much less then the granularity of the input levels 65, 66. In the present example, the granularity of the output is 10 times less than the granularity of the input. As a consequence, processes such as error diffusion or halftoning are used to attempt to approximate the display of the desired input image as close as possible using the limited number of output levels available. FIG. 11 shows a region of a line at a constant intensity, with portions 68, 69 representing adjacent pixels on a line.

The preferred embodiment is most effective in regions of near constant intensity level. In FIG. 11 it is assumed that such a region exists whereby the input 67 is of near constant intensity level for the portion of a line. In this example, the input intensity level 67 happens to also coincide with an output intensity level 63. Hence the error in the possible value that the output display can use to display this value is zero.

However, when using an input which is derived from an analogue source, it is inevitable that some form of 'noise' will be associated with the input signal. It is assumed for the purposes of discussion of the preferred embodiment that the form of noise is Gaussian and random in nature. The effect of this noise is to produce fluctuations in the input signal and this in turn can cause fluctuations in the output of the analogue to digital converters that convert the analogue input to a corresponding digital output level. For the purposes of discussion of the preferred embodiment it can be assumed that each analogue to digital converter produces an 8-bit output format and hence are capable of producing one of 8256 different levels in the range of 0 to 255.

Figure 12:
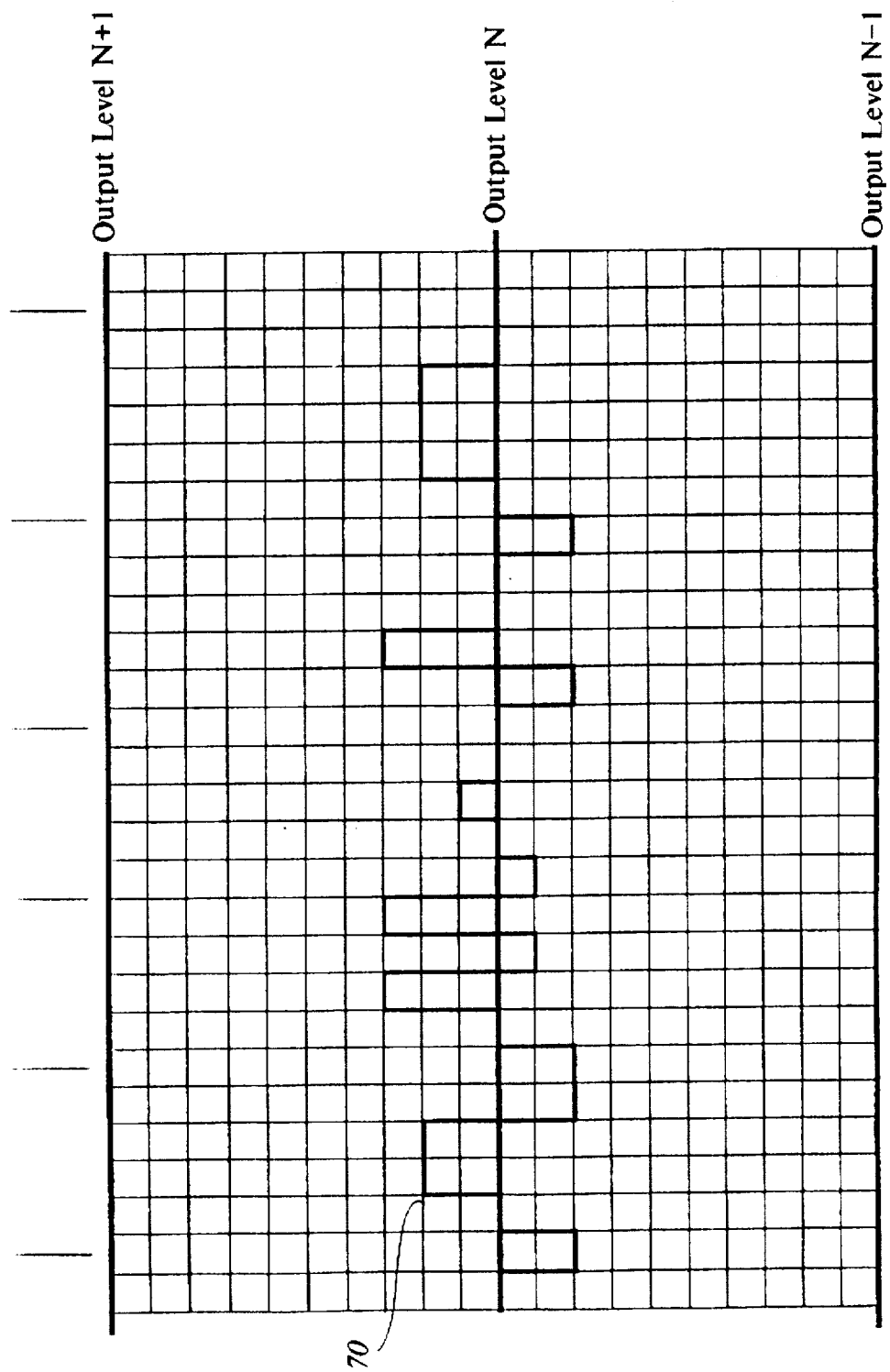
FIG. 12 is a graphical view of the pixel intensity level in FIG. 11 with noise added to the pixel intensity level.

Referring now to FIG. 12, there is shown a noise input signal 70 which consists of the input signal 67 of FIG. 11 with the addition of random Gaussian noise. The nature of this noise is substantially symmetric about an actual intensity value and causes the output of the analogue to digital converter to deviate from the true value of input signal 67 (FIG. 11).

If an error diffusion process such as the Floyd-Steinberg process is now used on the input signal 70, it is found that the output produced by the process is substantially unaffected by the effects of symmetrical forms of noise (provided they are not too large) as the effect of the error diffusion process is to spread the error associated with the display of a current pixel to adjacent pixels.

This has been found to have the affect of cancelling out low levels of symmetrical noise as the process acts somewhat like a low pass filter on an input signal. Hence the noise is not a significant problem.

Figure 13:
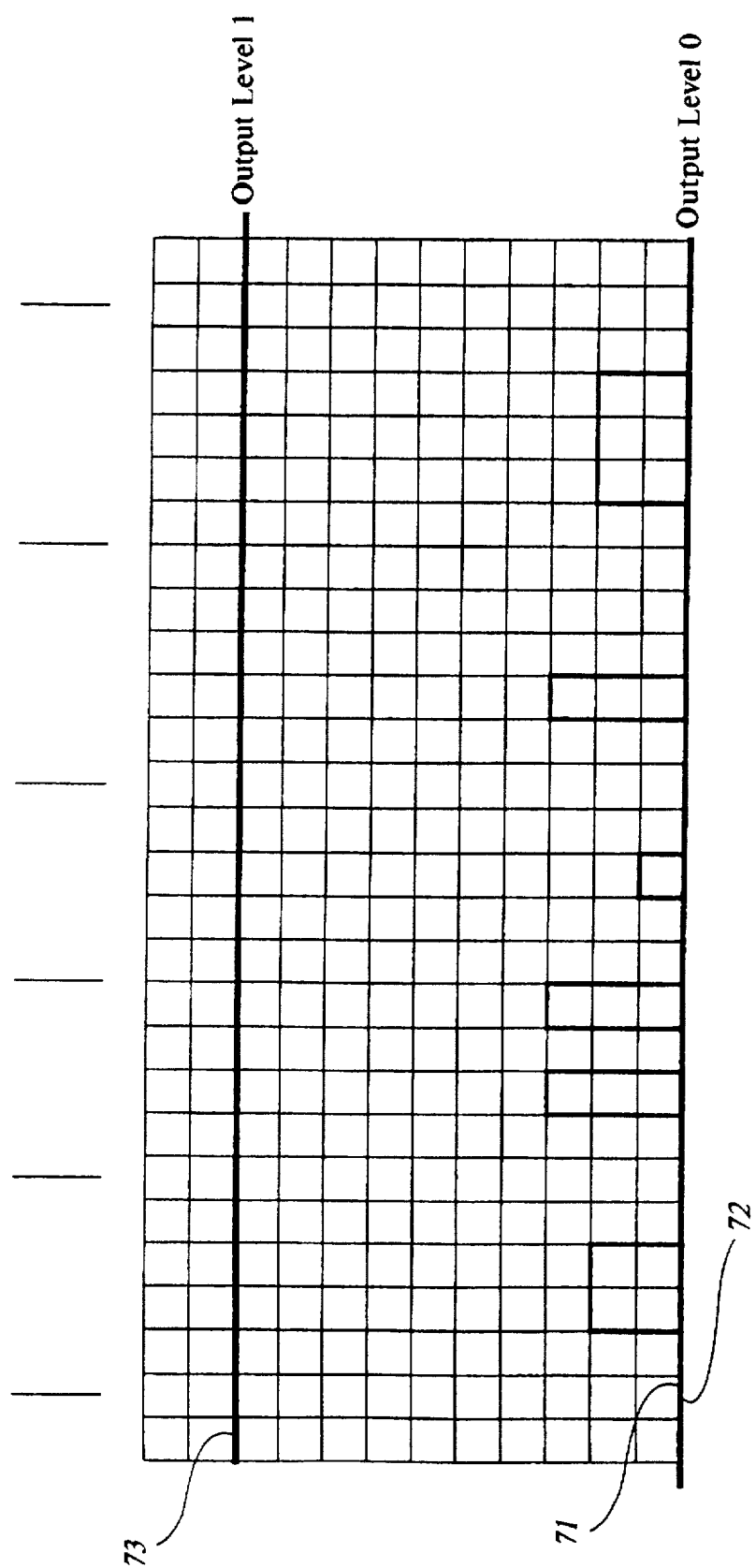
FIG. 13 is a graphical view of an input pixel intensity level of zero with noise which has been rectified.

Referring now to FIG. 13, there is shown the effect of noise near the extremity of the outputs of the analogue to digital converter. Noise at this (lower) extremity (and at the other (higher) extremity of the analogue to digital converter) can lead to the occurence of problems. The lowest value that the analogue to digital converter can output is set to be at a zero level, corresponding to the lowest analogue value expected from the computer device 11. Hence those values of the input signal that are below zero are rectified to zero by the analogue to digital converter and the output from the analogue to digital converter is in the form of rectified signal 72 with values less than output level signal 0 (71) being removed.

As mentioned previously, in error diffusing the rectified signal 72, the normal process of error diffusion takes the rectified signal 72 and determines which level is the closest level to the rectified signal 72 level (in this case output level signal 0 (71)) and takes the difference between these two levels and distributes it to adjacent pixels according to the particular error diffusion schema, with Floyd-Steinberg coefficients being the preferred schema. However, as the input is now in a rectified form and all the resultant differences are also in a positive form, it has been found that by diffusing these positive errors to adjacent pixels, the value of adjacent pixels (which includes that pixels actual value as well as the summation of error values from its adjacent pixels) can be built up to such a point that the output level 1 (73) becomes the closest pixel and consequently output level 1 (73) will be displayed on the output display device 16.

This has been found to give an unsightly distraction on the output display. Particularly in large areas of constant intensity of one colour as, when displaying the consequential error diffused representation of this area it is found that the area is 'sprinkled' with pixels of a different colour. This has been found to be particularly distracting and noticeable to an observer of the display. The problem does not appear to be as prominent in displaying areas of constant illuminated colour where the output level is other than at the extremity as the noise in the input signal will not be rectified by the analogue to digital converters and the error differences will be more likely to be smoothed out by adjacent pixels.

The preferred embodiment is directed to a noise quench method designed to remove rectified noise in colours in which one component is saturated or near the extremity of an analogue to digital conversion device. Although the preferred embodiment will be described in relation to a single primary colour, by using the method described in the preferred embodiment on each primary colour, the method can be applied to a display having multiple primary colours.

In the preferred embodiment, an attempt is made to determine if an input signal at the extremity of the analogue to digital converter is in essence only noise and hence the noise can be removed from the input signal before the input signal is used for halftoning.

For each pixel value that is less than a predetermined distance from zero, the three horizontally adjacent pixels on each side are examined. If two or more of these pixels are exactly zero, then the original pixel is assumed to really also represent a zero value and its value is set to zero. Similarly if a pixel's value is near 255(the saturation level), and two adjacent pixels of the three horizontally adjacent pixels on each side are exactly 255, then the pixel is set to 255. The predetermined distance value for deciding to force the pixel to a saturated value can be varied for each primary colour used in the display.

For an input line having M pixels on each line and primary colour input values being red, green and blue, the preferred method can be stated as:

For i=0 to M−1:

If $R(i)<R_{LT}$, and two or more of $\{R(i-3),R(i-2), R(i-1), R(i+1),R(i+2),R(i+3)\}$ are equal to 0, then $R_{out}(i)=0$;

If $R(i)>R_{UT}$, and two or more of $\{R(i-3),R(i-2), R(i-1), R(i+1),R(i+2),R(i+3)\}$ are equal to 255, then $R_{out}(i)=255$;

Otherwise, $R_{out}(i)=R(i)$.

If $G(i)<G_{LT}$, and two or more of $\{G(i-3),G(i-2),G(i-1), G(i+1), G(i+2), G(i+3)\}$ are equal to 0, then $G_{out}(i)=0$;

If $G(i)>G_{UT}$, and two or more of $\{G(i-3),G(i-2),G(i-1), G(i+1), G(i+2), G(i+3)\}$ are equal to 255, then $G_{out}(i)=255$;

Otherwise, $G_{out}(i)=G(i)$.

If $B(i)<B_{LT}$, and two or more of $\{B(i-3),B(i-2), B(i-1), B(i+1),B(i+2),B(i+3)\}$ are equal to 0, then $B_{out}(i)=0$;

If $B(i)>B_{UT}$, and two or more of $\{B(i-3),B(i-2), B(i-1), B(i+1),B(i+2),B(i+3)\}$ are equal to 255, then $B_{out}(i)=255$;

Otherwise, $B_{out}(i)=B(i)$.

Where $R(i)$, $G(i)$, $B(i)$ represent the red, green and blue values respectively for the pixel at position i of a line.

$R_{LT}$ and $R_{UT}$ are the predetermined upper and lower thresholds of the red value of a pixel.

$R_{out}(i)$, $G_{out}(i)$, $B_{out}(i)$ represent the values to be output to a halftoning arrangement for the red green and blue portions of a pixel i respectively.

Pixels at start and end of a line are treated as special cases and there values are not changed.

In order to better understand the preferred embodiment, there is provided in Appendix 1, a C-code simulation of the process of the preferred embodiment operating on a image having Red, Green and Blue components as outlined above. In this simulation, there is assumed to be provided an input colour image having a noise for each primary colour in an array 'in'. The main subroutine 'suppress_noise_image' uses another subroutine 'suppress_noise_plane()' to suppress the extremity noise of each individual primary colour separately.

Figure 14:
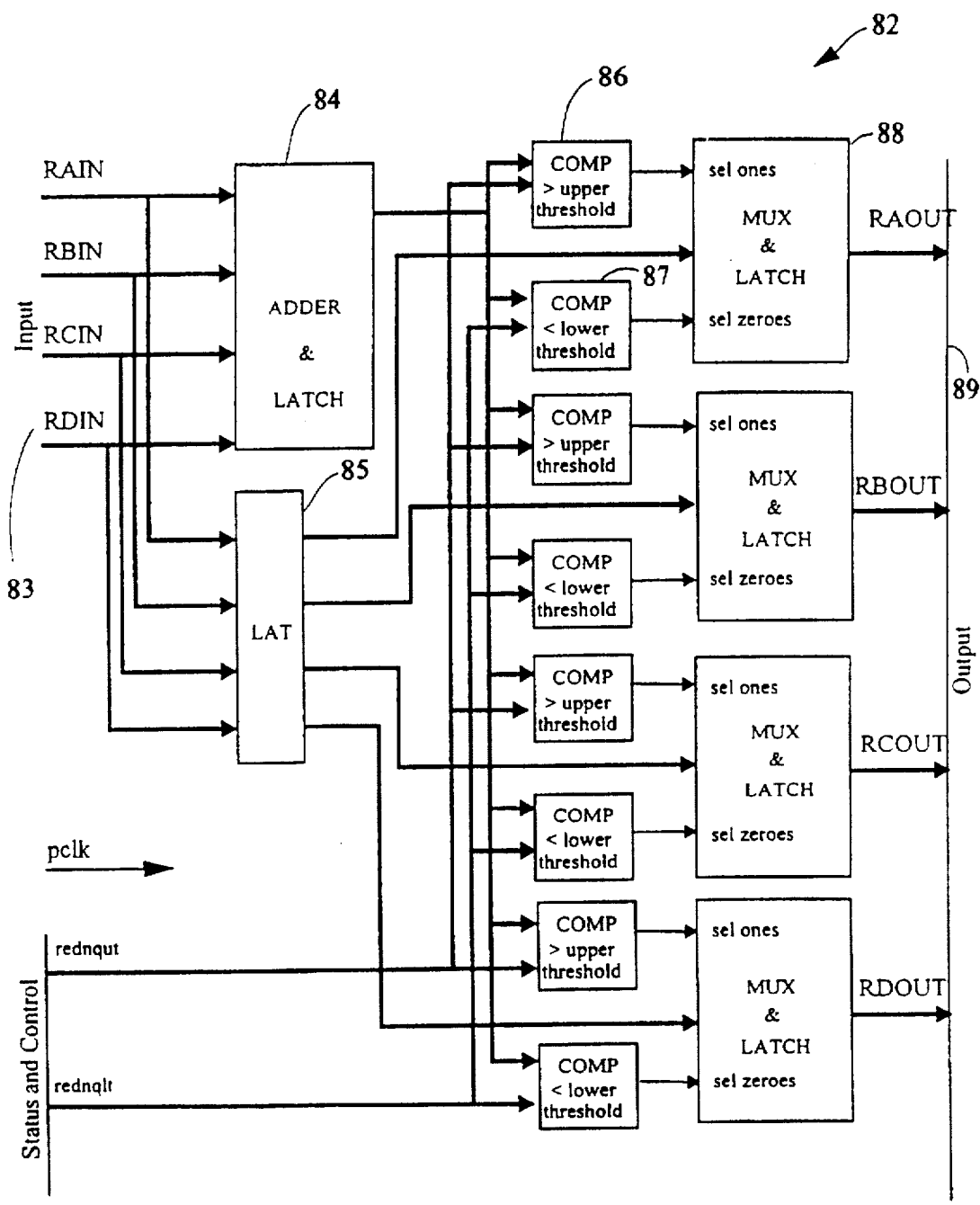
FIG. 14 is a schematic block diagram of an apparatus incorporating a simplified form of the preferred embodiment.

Referring now to FIG. 14, there is shown an apparatus 82 incorporating a simplified version of the methods of the preferred embodiment. The apparatus is designed specifically but not exclusively to work with a colour display system such as that set out in Australian Patent Application No. 53112/94, entitled "Colour Display System", claiming priority from Australian Provisional Patent Application No. PL 6765, filed 11 Jan. 1993 and the contents of which are hereby incorporated by cross-reference.

For the sake of clarity, only the Red data channel is shown, with the green and blue channels being equivalent.

In the apparatus 82, data is input 83 at a rate of four pixels at a time. If the sum of the four pixels is greater than an upper threshold, then all four pixel samples are set to 255. Similarly, if the sum of four pixels is less than a lower threshold, then all four samples are set to 0. Otherwise, the pixels are passed to the output unaltered. An adder and latch 84 adds together the input values while a latch 85 stores the input values. Once added together each pixel is compared against an upper threshold 86 and a lower threshold 87 to determine 88 whether each output pixel value 89 should be the highest possible value, the lowest possible value or the input value.

The foregoing describes only one embodiment of the present invention specific to a system for displaying RGB formatted data. Modifications including extensions to other colour systems such as black and white or CYMK, obvious to those skilled in the art, can be made thereto without departing from the scope of the present invention.

---

APPENDIX 1

```
typedef short int int16;
#define RED 0
#define GREEN 1
#define BLUE 2
#define PREDETERMINED_THRESHOLD 10
/********************************************************
    void suppress_noise_image(out,in,len_x,len_y)
        This subroutine applies the method outlined in the preferred embodiment to
each colour independently. The subroutine suppress_noise_plane() suppresses rectified
noise for an individual colour. 'in' is a 3 element array with each element containing the
input image (with noise) for one of the primary colours. len_x is the number of pixels on a
line and len_y is the number of lines in an image.The noise quenched image is similarly
stored in 'out'
********************************************************/
void suppress_noise_image(out,in,len_x,len_y)
int16***out,***in;
int len_x,len_y;
{
int color;
for(color=0;color<3;++color)
    {
    suppress_noise_plane(out[color],in[color],len_x,len_y);
    }
}
/********************************************************************
void suppress_noise_plane(out,in,len_x,len_y) This subroutine works on an
image stored in a 2-dimensional array stored on a line by line basis. The input image
is stored in the array 'in' and from this is created an output array stored in 'out'.
    Firstly, the ends of each line are dealt with as a special case by copying over the
values in 'in' to 'out'.
    The method described in the preferred embodiment is then applied to each other
pixel in the array.
********************************************************/
void suppress_noise_plane(out,in,len_x,len_y)
int16**out,**in;
int len_x,len_y;
{
int x,y,test_x,saturated_count;
for(y=0;y<len_y;++y)
/* deal with elements at the ends of each line */
    {
        out[y][0] = in[y][0];
        out[y][1] = in[y][1];
        out[y][2] = in[y][2];
        out[y][len_x-1] = in[y][len_x-1];
        out[y][len_x-2] = in[y][len_x-2];
        out[y][len_x-3] = in[y][len_x-3];
    }
for (y=0;y<len_y;++y)
for (x=3;x<len_x-3;++x)
/* deal with all the other pixels */
    {
        if(in[y][x]<PREDETERMINED_THRESHOLD)
        {/* determine if lower value should have been zero */
```

APPENDIX 1

```
            saturated_count = 0;
            for(test_x=x-3;test_x<=x+3;++test_x)
            {       if(in[y][test_x]=0){ ++saturated_count;
                }
            }
            if (saturated_count >=2)
                    {/* more than 2 of its neighbours were zero so consider the current
value to be actually zero */        out[y][x] = 0;
            }
            else
            {/* do nothing */
            out[y][x] = in[y][x];
            }
        }
                    else if (in[y][x] > 255 - PREDETERMINED_THRESHOLD)
                    {/* determine if upper value should have been equal to the
maximum output value*/
            saturated_count = 0;
                for (test_x=x-3;test_x<=x+3;++test_x)
                {            if(in[y][test_x] == 255){
                                                    ++saturated_count;
                    }
                }
                if(saturated_count >= 2)
                {/*current pixel really should have been 255 */
                out[y][x] = 255;
                }
                    else
                        {           out[y][x] = in[y][x];
                        }
            }
            else
            {
                out[y][x] = in[y][x];
            }
        }
    }
```

We claim:

1. A computer-implemented method for suppressing noise in an input image comprising a plurality of pixels, each of the pixels having a range of possible values between at least two extremities, said method comprising the steps of:

determining a first group of pixels, each pixel of the first group having a value that is less than a predetermined amount from the value of at least one of the extremities;

examining the values of pixels adjacent to each pixel in the first group to determine if the adjacent pixels are also members of the first group;

reassigning, when a predetermined number of the pixels adjacent to a pixel in the first group are also members of the first group, the pixel value of that pixel in the first group and each of its adjacent pixels to have the value of said at least one of the extremities and when the predetermined number of pixels adjacent to a pixel in the first group are not members of the first group, leaving the values of that pixel and the predetermined number of pixels unaltered; and utilizing the reassigned pixel values in the production of an image.

2. A computer-implemented method as recited in claim 1, wherein each pixel value comprises a plurality of primary values, wherein said determining step includes determining, for each of the plurality of primary values, whether the primary value is less than a predetermined amount from a corresponding extremity value, and wherein said examining step includes examining corresponding primary values of adjacent pixels to determine if the corresponding primary values are at an extremity of a corresponding primary value range.

3. A computer-implemented method for suppressing noise in an input image comprising a plurality of pixels, the pixels comprising a plurality of primary colors each having a range of possible values distributed between two extremity values, said method comprising the steps of:

determining a first group of pixels, each pixel of the first group having primary color values that are less than a predetermined amount from a corresponding one of the extremity values;

examining corresponding primary color values of pixels adjacent to each pixel in the first group to determine if the adjacent pixels are also members of the first group; and reassigning, when a predetermined number of the pixels adjacent to a pixel in the first group are also members of the first group, at least one primary color value of that pixel in the first group and each of its adjacent pixels to be equal to the said one corresponding extremity value, and when the predetermined number of pixels adjacent to a pixel in the first group are not members of the first group, leaving the values of that pixel and the predetermined number of pixels unaltered.

4. A computer-implemented method as recited in claim 3, wherein the plurality of pixels comprising the input image are arranged in lines, and wherein a pixel in the first group and its adjacent pixels are pixels on the same line of the image.

5. An apparatus for suppressing noise in an input image, the input image comprising a plurality of pixels each having a corresponding pixel value in a range of possible pixel values between two extremity values, said apparatus comprising:

detecting means for detecting pixels that have a pixel value near one of the extremity values and for forming a group comprising the detected pixels, said detecting means comprising means for adding together pixel values of groups of pixels and determining if the resulting sum exceeds a first upper threshold or is less than a second lower threshold; and reassignment means for reassigning the value of the pixels in the group to that extremity value corresponding to said threshold exceeded or unattained when a predetermined number of the pixels adjacent to a detected pixel are also near said one of the extremity values.

6. An image processing apparatus for processing an input image including input image data, the input image comprising a plurality of pixels each having a plurality of primary colors having a range of possible values between two corresponding extremity values, said image processing apparatus comprising:

a color output device configured to display color image data corresponding to the input image data;

suppressing means for suppressing noise included in the input image data, said suppressing means comprising:

determining means for determining a first group of pixels, each pixel of the first group having primary color values that are less than a predetermined amount from a corresponding one of the extremity values;

examining means for examining corresponding primary color values of pixels adjacent to each pixel in the first group to determine if the adjacent pixels are also members of the first group, and reassigning means for reassigning, when a predetermined number of the pixels adjacent to a pixel in the first group are also members of the first group, at least one primary color value of that pixel in the first group and each of its adjacent pixels to be equal to said one corresponding extremity value and for leaving, when said predetermined number of pixels adjacent to a pixel in the first group are not members of the first group, the values of that pixel and said predetermined number of pixels unaltered; and mapping means for mapping the input image data into a restricted color space that defines colors displayable by said color output device.

7. An image processing apparatus as recited in claim 6, wherein said suppressing means smooths the input image data.

8. A method for suppressing noise in an input image, the input image having a plurality of pixels each having a corresponding pixel value and a range of possible pixel values between two extremity values, the method comprising the steps of:

detecting pixels that have a pixel value near one of the extremity values and forming a group comprising the detected pixels, wherein the detecting step includes the step of adding together pixel values of groups of pixels and determining if the resulting sum exceeds a first upper threshold or is less than a second lower threshold; and reassigning the value of the pixels in the group to that extremity value corresponding to said threshold exceeded or unattained when a predetermined number of the pixels adjacent to a detected pixel are also near the one of the extremity values.

9. An apparatus for suppressing noise in an input image comprising a plurality of pixels, each of the pixels having a range of possible values between at least two extremities, said apparatus comprising:

means for determining a first group of pixels, each pixel of the first group having a value that is less than a predetermined amount from the value of at least one of the extremities;

means for examining the values of pixels adjacent to each pixel in the first group to determine if the adjacent pixels are also members of the first group;

means for reassigning, when a predetermined number of the pixels adjacent to a pixel of the first group are also members of the first group, the pixel value of that pixel in the first group and each of its adjacent pixels to have a value of said at least one of the extremities, and for leaving, when said predetermined number of pixels adjacent to a pixel in the first group are not members of the first group, the values of that pixel and the predetermined number of pixels unaltered; and means for utilizing the reassigned pixel values in the production of an image.

10. The apparatus as recited in claim 9, wherein each pixel value comprises a plurality of primary values, and wherein said determining means determines, for each of the plurality of primary values, whether the primary value is less than a predetermined amount from a corresponding extremity value, and wherein said examining means examines corresponding primary values of adjacent pixels to determine if the corresponding primary values are at an extremity of a corresponding primary value range.

* * * * *

UNITED STATES PATENT AND TRADEMARK OFFICE
CERTIFICATE OF CORRECTION

PATENT NO. : 5,757,516

DATED : May 26, 1998

INVENTOR(S) : Naylor, Jr.

It is certified that error appears in the above-identified patent and that said Letters Patent is hereby corrected as shown below:

COLUMN 4:

Line 6, "on the" should be deleted.
Line 7, "FLCD display 16." should read --display on the FLCD 16.--.

COLUMN 7:

Line 13, "8256" should read --256--.

Signed and Sealed this

Fourth Day of May, 1999

Attest:

Q. TODD DICKINSON

Attesting Officer     Acting Commissioner of Patents and Trademarks